US009096151B2

(12) United States Patent
Canonge et al.

(10) Patent No.: US 9,096,151 B2
(45) Date of Patent: Aug. 4, 2015

(54) LAWN CARE VEHICLE ADJUSTABLE SEAT

(75) Inventors: Eric Canonge, Charlotte, NC (US); Thomas Limpo, Fort Mill, SC (US); Bruce Fredricks, Grand Haven, MI (US); Jim Biros, Nunica, MI (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/117,263

(22) PCT Filed: May 27, 2011

(86) PCT No.: PCT/US2011/038285
§ 371 (c)(1),
(2), (4) Date: Nov. 12, 2013

(87) PCT Pub. No.: WO2012/166084
PCT Pub. Date: Dec. 6, 2012

(65) Prior Publication Data
US 2014/0183849 A1 Jul. 3, 2014

(51) Int. Cl.
*B60N 2/22* (2006.01)
*A47C 7/40* (2006.01)
*A01D 34/82* (2006.01)
*B62D 1/02* (2006.01)

(52) U.S. Cl.
CPC *B60N 2/22* (2013.01); *A01D 34/82* (2013.01); *A47C 7/402* (2013.01); *B62D 1/02* (2013.01); *B60N 2002/2204* (2013.01)

(58) Field of Classification Search
CPC ............ B60N 2/2236; B60N 2002/2204; A47C 7/402; A47C 7/46; A47C 7/462
USPC .............. 297/230.14, 367 L, 301.7, 301.1; 296/65.01, 66; 280/771
See application file for complete search history.

(56) References Cited

U.S. PATENT DOCUMENTS

| 2,712,346 A | 7/1955 | Sprinkle |
| 3,215,470 A | 11/1965 | Swenson et al. |
| 3,526,430 A | 9/1970 | Eldon, III |
| 4,154,477 A | 5/1979 | Swenson et al. |
| 4,221,430 A | 9/1980 | Frobose |
| 4,573,737 A | 3/1986 | Korn |

(Continued)

FOREIGN PATENT DOCUMENTS

| CA | 2171651 C | 9/1996 |
| EP | 0759714 B1 | 1/2000 |

(Continued)

OTHER PUBLICATIONS

U-Shaped Design Offers Enhanced Comfort published Apr. 15, 2008, http://www.linde-mh.com/en/main_page/news/pressreleases/pressreleases_1_76.jsp, all enclosed pages cited.

(Continued)

*Primary Examiner* — James English
(74) *Attorney, Agent, or Firm* — Nelson Mullins Riley & Scarborough LLP

(57) ABSTRACT

A riding lawn care vehicle may include a frame, a seat base and an adjustable seat. Wheels of the riding lawn care vehicle may be attachable to the frame. The seat base may also be coupled to the frame. The adjustable seat may be coupled to the seat base of the riding lawn care vehicle to enable selectable repositioning of at least a portion of the adjustable seat at variable distances from the seat base.

20 Claims, 9 Drawing Sheets

(56) References Cited

U.S. PATENT DOCUMENTS

| | | | |
|---|---|---|---|
| 4,632,458 A * | 12/1986 | Brown et al. | 297/353 |
| 4,752,982 A * | 6/1988 | Jones et al. | 5/634 |
| 5,016,722 A * | 5/1991 | Morita et al. | 180/89.14 |
| 5,037,158 A * | 8/1991 | Crawford | 297/353 |
| 5,582,460 A | 12/1996 | Schultz | |
| 5,586,809 A | 12/1996 | Szmadzinski | |
| 5,685,609 A | 11/1997 | Miotto | |
| 5,711,576 A | 1/1998 | Olson et al. | |
| 5,725,278 A * | 3/1998 | Verbeek | 297/353 |
| 5,882,078 A | 3/1999 | Gebhard | |
| 5,884,969 A | 3/1999 | Gebhard | |
| 6,155,643 A | 12/2000 | Gorgi et al. | |
| 6,736,084 B2 * | 5/2004 | McDonough et al. | 114/363 |
| 6,923,503 B2 * | 8/2005 | Sangiorgio | 297/342 |
| 6,938,956 B1 * | 9/2005 | Piretti | 297/284.7 |
| 7,275,790 B2 * | 10/2007 | Chi | 297/353 |
| 7,740,315 B2 * | 6/2010 | Ball et al. | 297/284.4 |
| 2003/0111888 A1 * | 6/2003 | Brennan | 297/316 |
| 2004/0075291 A1 | 4/2004 | Rupiper et al. | |
| 2005/0017396 A1 | 1/2005 | Pearce et al. | |
| 2014/0167398 A1 * | 6/2014 | Burns et al. | 280/775 |

FOREIGN PATENT DOCUMENTS

| | | |
|---|---|---|
| GB | 490735 A | 8/1938 |
| JP | 07265168 A2 | 10/1995 |

OTHER PUBLICATIONS

Northern Industrial Polyurethane Cushioned Tractor Seat, printed from http://www.pricethattool.com/product/Northern-Industrial-Polyurethane-Cushioned-Tractor-Seat.html on Jan. 7, 2011, all enclosed pages cited.

Drakopoulos, D.: "A Review of the Current Seat Technologies in Agricultural Tractors," printed Jan. 7, 2011, all enclosed pages cited.

International Search Report and Written Opinion of PCT/US2011/038285 mailed Sep. 27, 2011, all enclosed pages cited.

Chapter I International Preliminary Report on Patentability of PCT/US2011/038285 mailed Dec. 2, 2013, all enclosed pages cited.

* cited by examiner

LAWN CARE VEHICLE ADJUSTABLE SEAT

TECHNICAL FIELD

Example embodiments generally relate to lawn care vehicles and, more particularly, relate to an adjustable seat for vehicles configured for performing lawn maintenance.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines (e.g., less than 200 cubic centimeters (cc)) and are relatively inexpensive. Meanwhile, at the other end of the spectrum, riding lawn mowers, such as lawn tractors, can be quite large and sometimes have engines exceeding 400 cc. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

By their very nature, riding lawn mowers include seats. The seats are typically one piece units that are essentially fixed in their structure and configuration. Although the seats of many riding lawn mowers may be padded, customization of the fit of the seats is typically limited to an ability to purchase and apply seat covers. Thus, most seats are relatively inflexible in terms of their ability to be adjusted for rider comfort.

BRIEF SUMMARY OF SOME EXAMPLES

Accordingly, in order to improve operator comfort, some example embodiments may provide an adjustable seat for use on a lawn care vehicle. Such an adjustable seat may enable operators to make seat adjustments to positively impact user experience in relation to comfort and ease of operation. Moreover, in some cases, an adjustable seat may also enable a reduction in packing materials for product shipments, since the adjustable seat may provide options for reduction of the overall seat profile.

In one example embodiment, a riding lawn care vehicle is provided. The riding lawn care may include a frame, a seat base and an adjustable seat. Wheels of the riding lawn care vehicle may be attachable to the frame. The seat base may also be coupled to the frame. The adjustable seat may be coupled to the seat base of the riding lawn care vehicle to enable selectable repositioning of at least a portion of the adjustable seat at variable distances from the seat base.

In another example embodiment, an adjustable seat configured to be attachable to a seat base coupled to a frame of a riding lawn care vehicle is provided. The adjustable seat may include a seat frame, a seat bottom and a seat back. The seat frame may include a seat bottom support section forming a first portion of an L-shaped structure defining the seat frame and a seat back support section forming a second portion of the L-shaped structure where the seat frame is attachable to the seat base. The seat bottom may be coupled to the seat bottom support section. The seat back may be slidingly coupled to the seat back support section of the seat frame to enable selectable repositioning of seat back at variable distances from the seat bottom.

Some example embodiments may improve an operator's ability to manipulate the position of the seat back of a lawn care vehicle seat. The user experience associated with achieving a comfortable ride on a riding lawn care vehicle may therefore be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1, which includes FIGS. 1A and 1B, illustrate a riding lawn care vehicle having an adjustable seat according to an example embodiment;

Figure 4A:
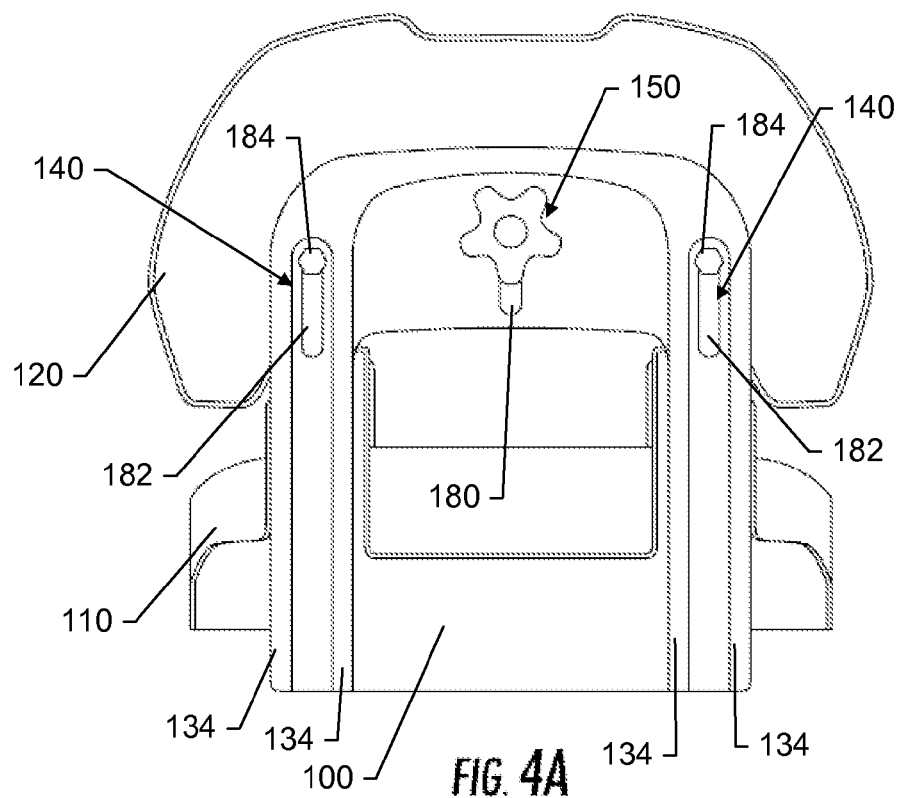
Figure 4B:
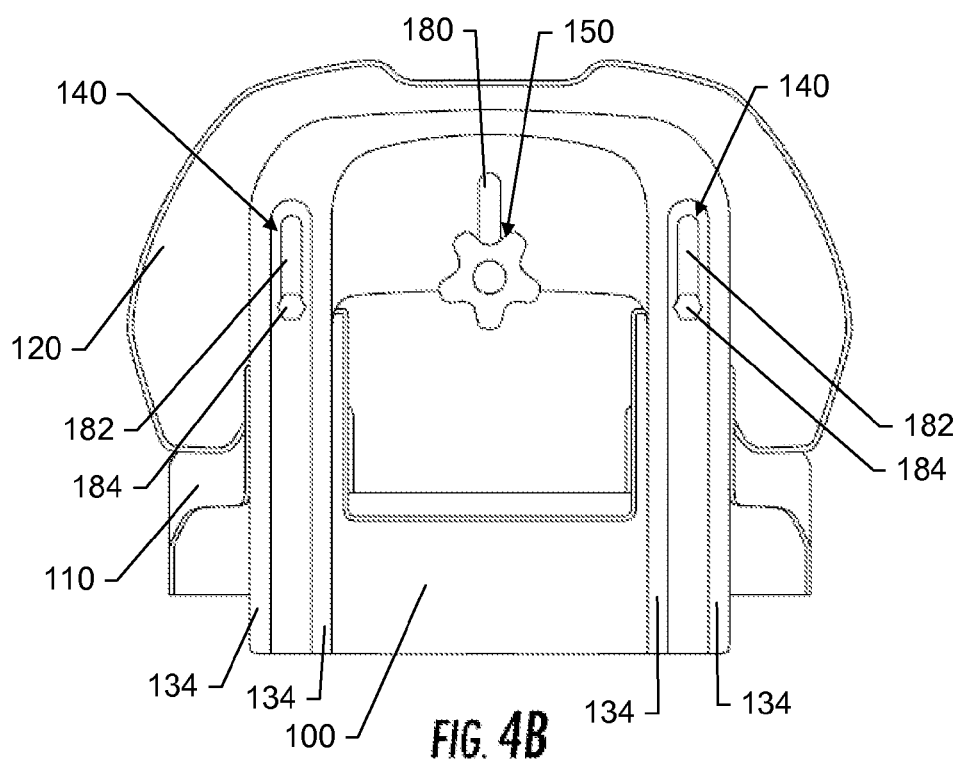
Figure 5:
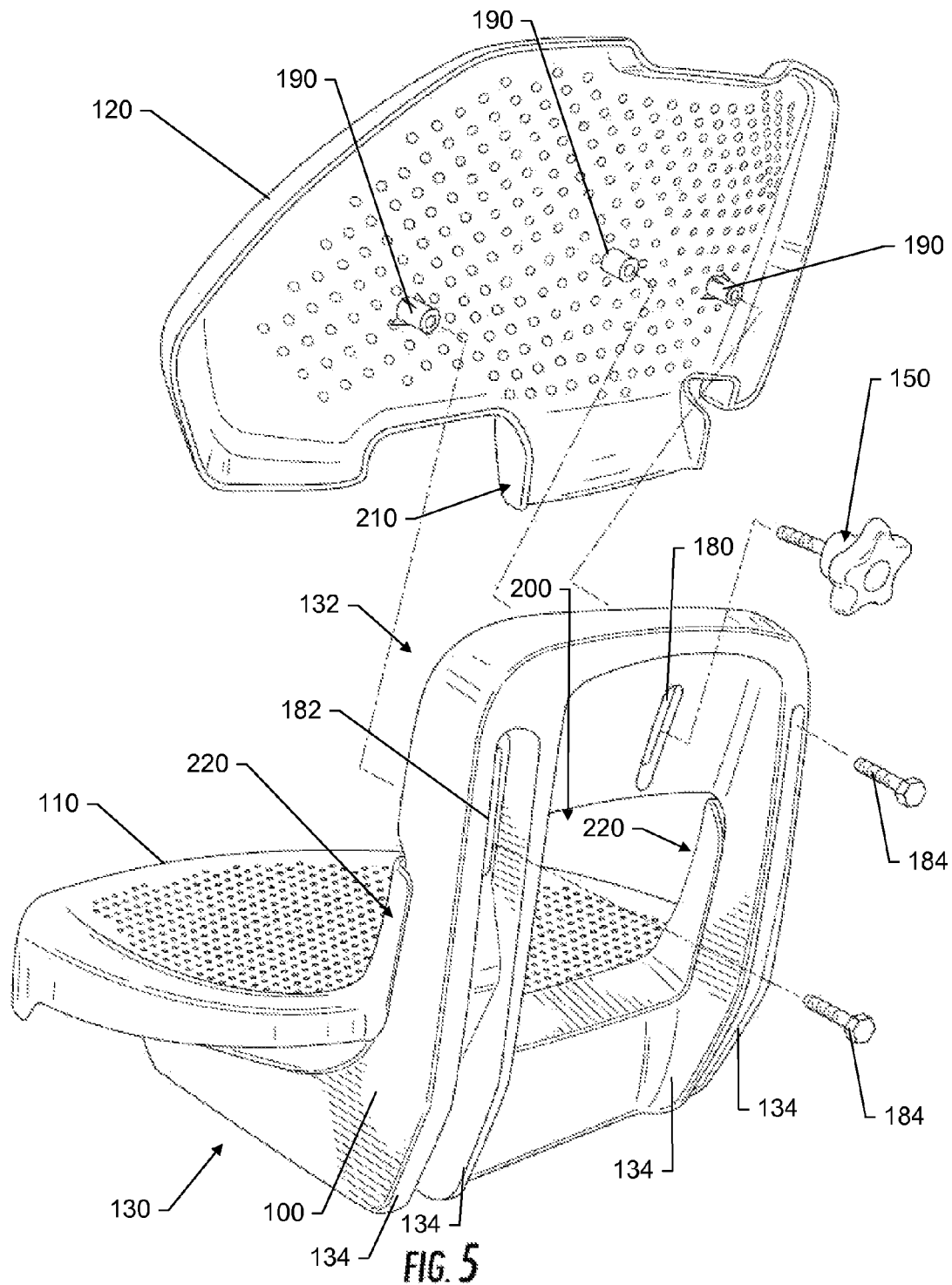
Figure 6:
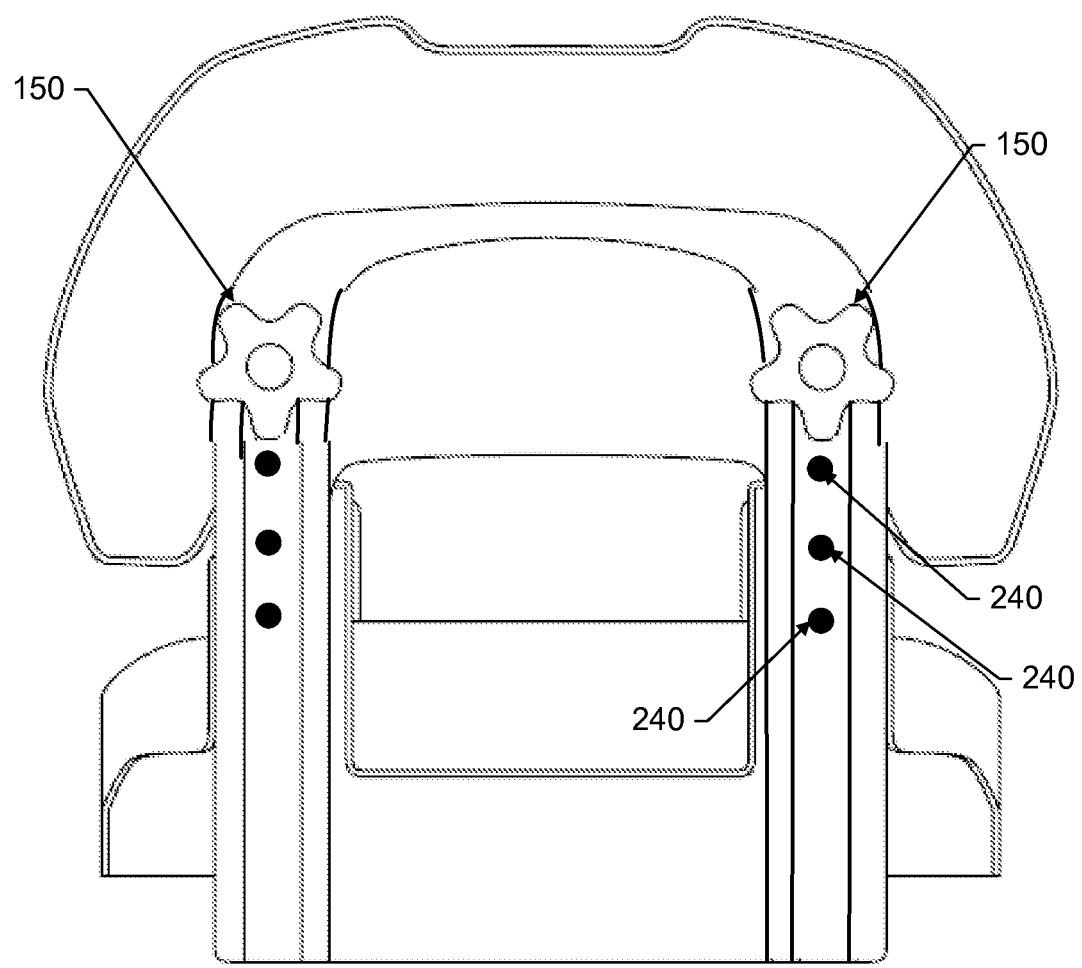
Figure 7:
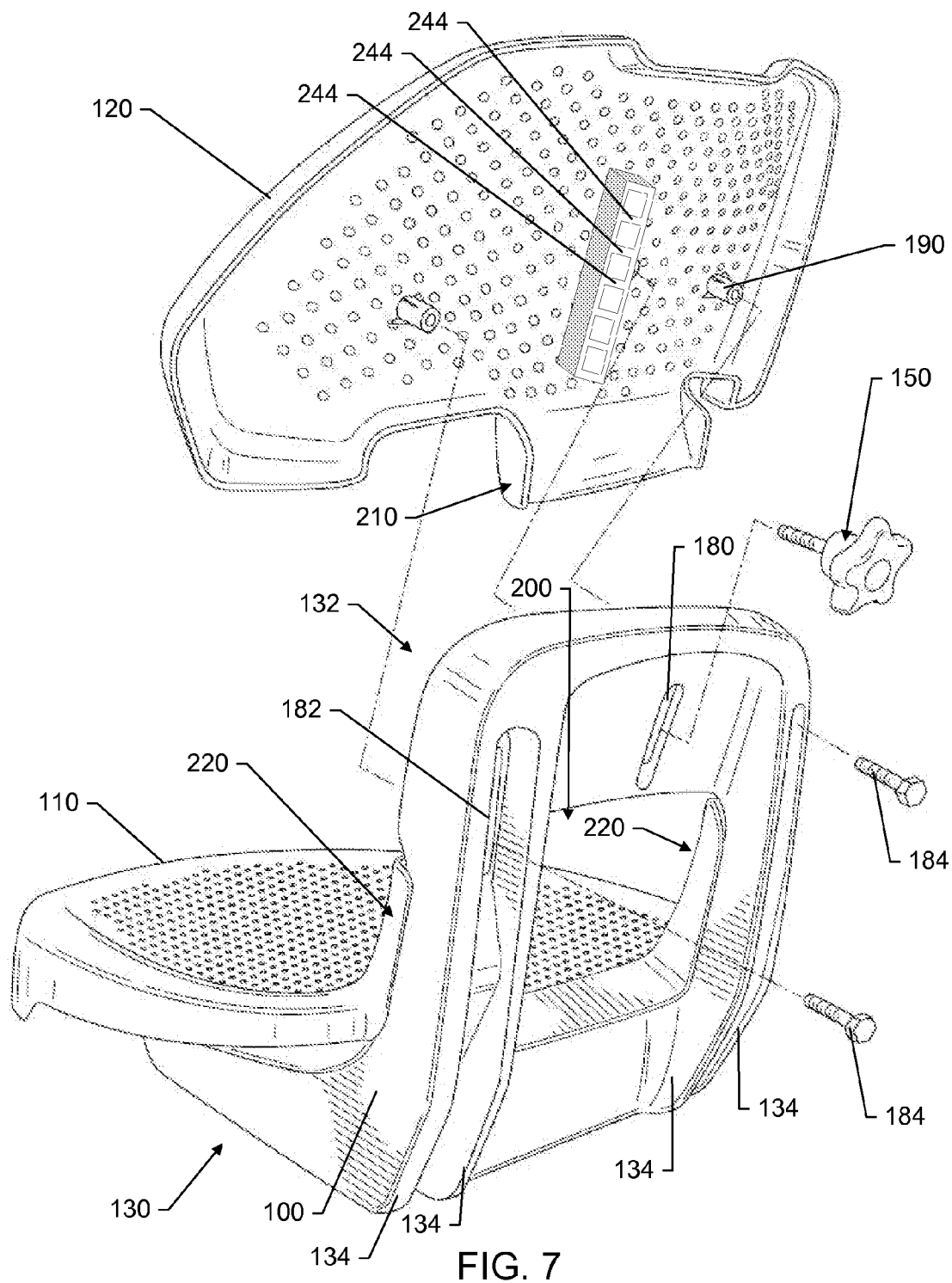
Figure 8:
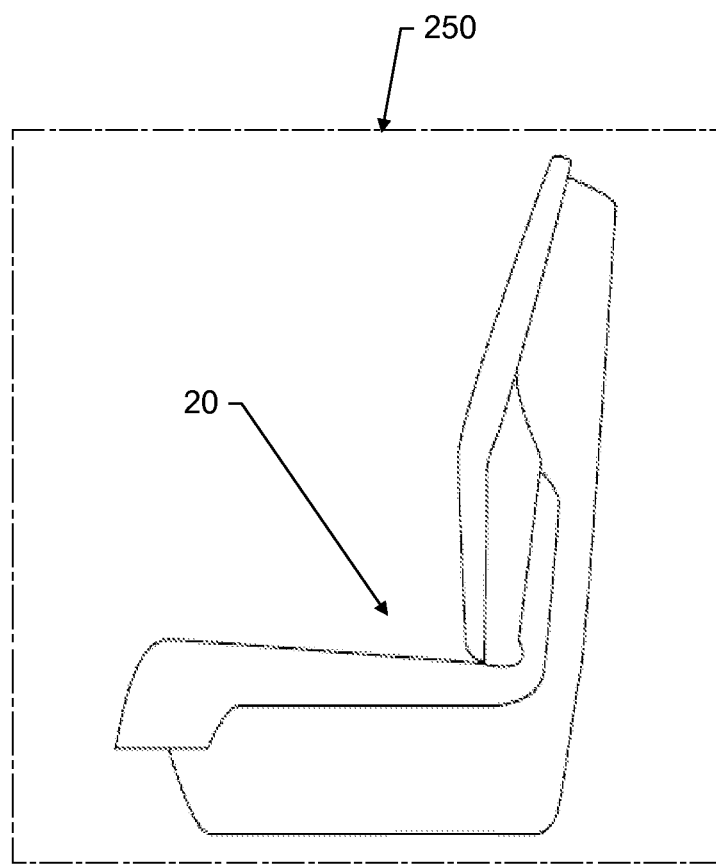

FIG. 4, which includes FIGS. 4A and 4B, illustrates a back view of the adjustable seat in a fully raised or extended position (FIG. 4A) and in a fully lowered or retracted position (FIG. 4B) according to an example embodiment;

FIG. 5 illustrates an exploded perspective view of the adjustable seat according to one example embodiment;

FIG. 6 illustrates an alternative structure for supporting the adjustment member in an example embodiment;

FIG. 7 illustrates another alternative structure for supporting the adjustment members according to another example embodiment; and FIG. 8 illustrates a side view of the adjustable seat boxed for shipment in the fully retracted position according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

Some example embodiments may improve operator comfort for operators of lawn care vehicles such as, for example, riding lawn mowers. In this regard, some example embodiments may provide an adjustable seat for use on a lawn care vehicle. Such an adjustable seat may enable operators to make seat adjustments beyond merely moving the seat forward or backward relative to the steering mechanism of the lawn care vehicle. In this regard, for example, some example embodiments may provide for seat back height adjustments. As such, while the seat frame, base and/or bottom may remain stationary, the seat back may be adjusted up or down to enable the operator to tailor the back support provided to his or her liking for improved comfort. Furthermore, an adjustable seat may also enable a reduction in packing materials for product shipments, since the adjustable seat may provide options for reduction of the overall seat profile.

Figure 1A:
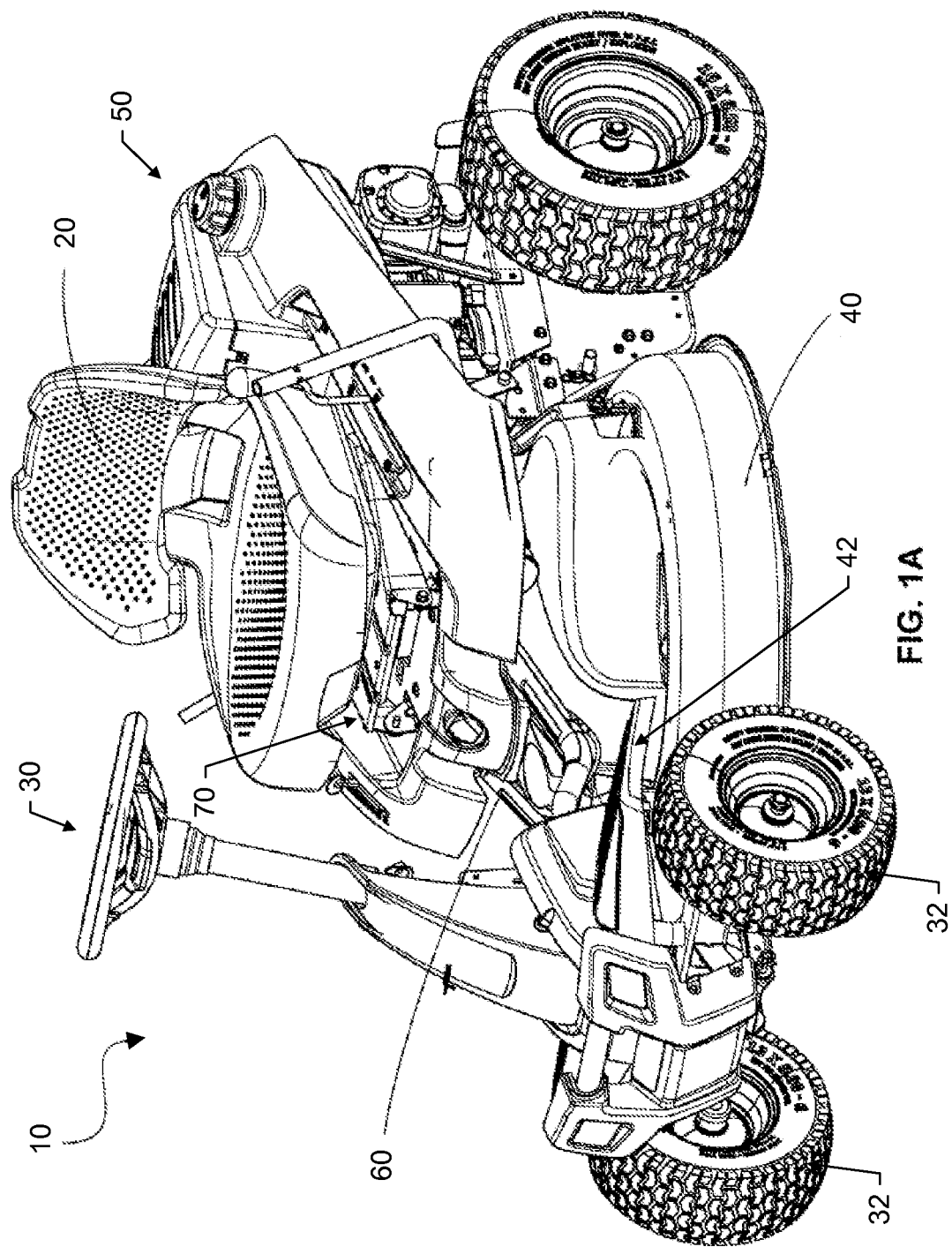
Figure 1B:
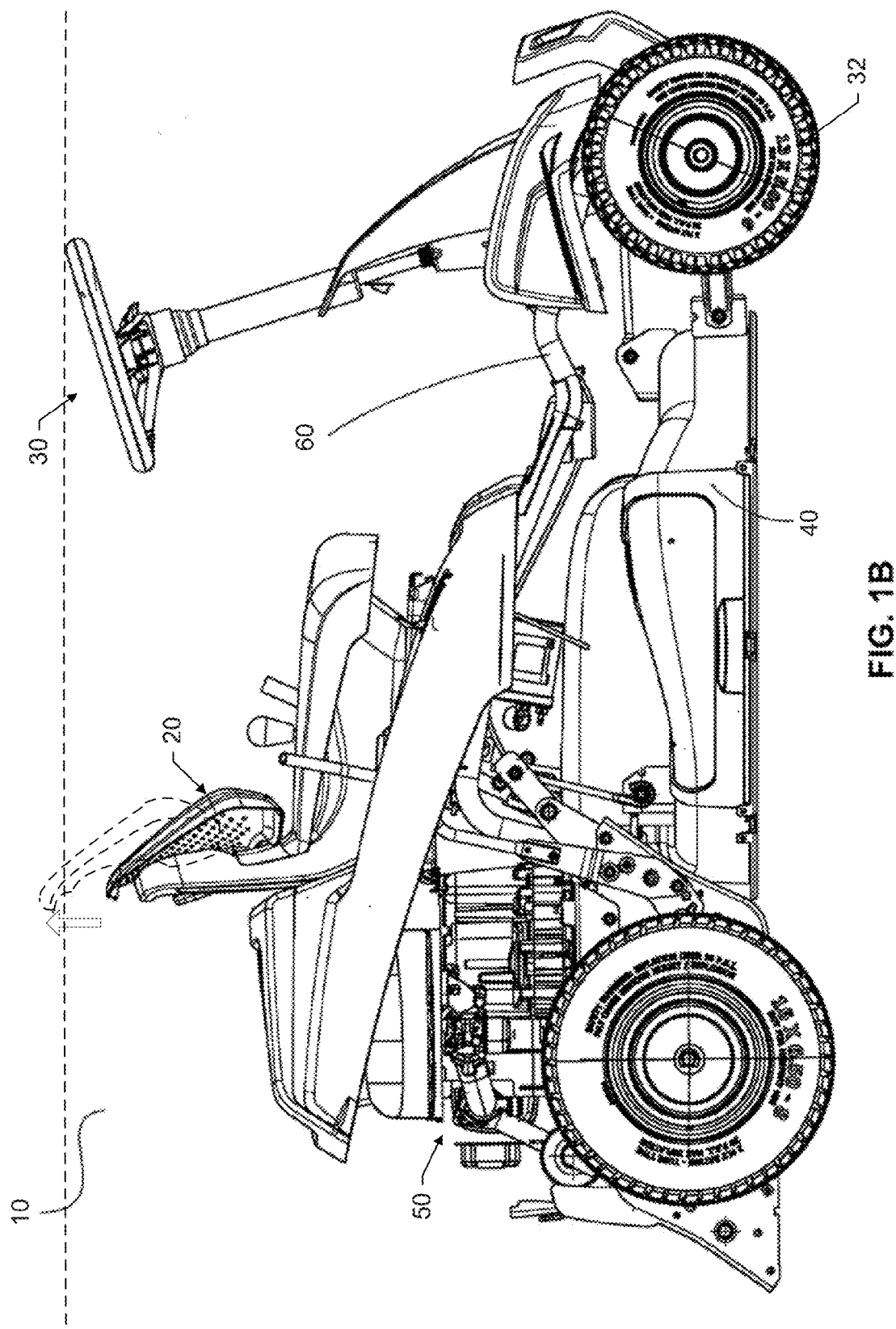

FIG. 1, which includes FIGS. 1A and 1B, illustrate a riding lawn care vehicle 10 having an adjustable seat 20 according to an example embodiment. FIG. 1A illustrates a perspective view of the riding lawn care vehicle 10, which in this example is a riding lawn mower. However, it should be appreciated that example embodiments could also be applicable to other riding lawn care vehicles as well. FIG. 1B illustrates a side view of the riding lawn care vehicle 10.

In some embodiments, the riding lawn care vehicle 10 may include a steering assembly 30 (e.g., a steering wheel, handle bars, or the like) functionally connected to front wheels 32 of the riding lawn care vehicle 10 to allow the operator to steer the riding lawn care vehicle 10. The operator may sit on the adjustable seat 20, which may be disposed to the rear of the steering assembly 30 near a rear portion of the riding lawn care vehicle 10. However, it should be appreciated that the seat could alternatively be disposed near a center portion of the riding lawn care vehicle 10, or even in the front portion in some examples. The riding lawn care vehicle 10 may also include a cutting deck 40 having at least one cutting blade mounted therein. The cutting deck 40 may be positioned behind the front wheels 32 in a position to enable the operator to cut grass using the cutting blade when the cutting blade is rotated below the cutting deck 40 when the cutting deck 40 is in a cutting position. However, in some alternative examples, the cutting deck 40 may be positioned in front of the front wheels 32. In some embodiments, a footrest 42 (e.g., one on each side of the riding lawn care vehicle 10) may also be positioned above the cutting deck 40 and/or above the front wheels 32 to enable the operator to rest his or her feet thereon while seated in the adjustable seat 20. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed below and to the rear of a seated operator. However, in other example embodiments, the engine 50 could be in different positions such as in front of the operator. As shown in FIG. 1, the engine 50 may be operably coupled to rear wheels 52 to provide drive power for the riding lawn care vehicle 10. The engine 50, the steering assembly 30, the cutting deck 40, the adjustable seat 20 and other components of the riding lawn care vehicle 10 may be operably connected (directly or indirectly) to a frame 60 of the riding lawn care vehicle 10. The frame 60 may be a rigid structure configured to provide support, connectivity and interoperability functions for various ones of the components of the riding lawn care vehicle 10. In an example embodiment, a seat base 70 may be directly or indirectly coupled to the frame 60 to provide a point of attachment for connecting the adjustable seat 20 to the riding lawn care vehicle 10. In some embodiments, the seat base 70 may be directly coupled to the frame 60 by being integrally formed with a frame member.

In some example embodiments, the seat base 70 may be embodied as a metallic assembly or weldment that may be welded, bolted or otherwise attached to the frame 60 to provide attachment points for the adjustable seat 20. In other example embodiments, the seat base 70 includes holes, protrusions, slots, and/or other attachment structures integrally formed in one or more frame members. The seat base 70 may be a fixed structure in some embodiments. However, in other example embodiments, the seat base 70 may be adjustable. In this regard, for example, the seat base 70 may be configured to be slidable in fore and aft directions (e.g., toward the front and rear of the riding lawn care vehicle 10, respectively). In example embodiments where the seat base 70 is adjustable, the adjustability of the seat may be provided in any of a number of ways. For example, a fore/aft position adjustment member may be provided in the form of a releasable detent or engagement bar that may be alternately engaged to fix a position of the seat base 70 or disengaged to enable sliding of the seat base 70 relative to the frame 60 in the fore and aft directions. Controls for engaging and/or disengaging the fore/aft position adjustment member may be positioned proximate to a front, back or side of the adjustable seat 20.

Figure 2:
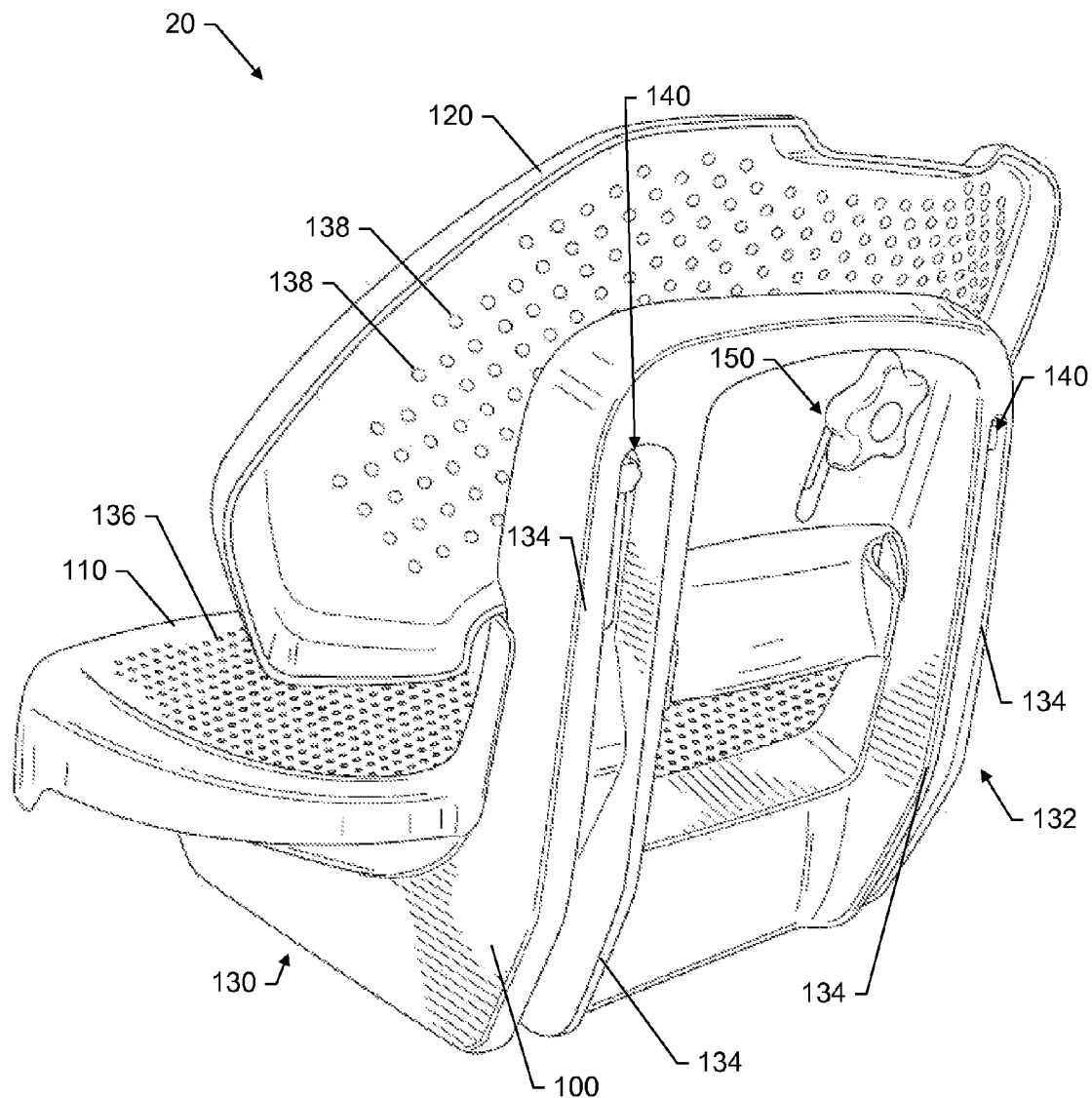
FIG. 2 illustrates a perspective view of the adjustable seat in a fully raised or extended position according to an example embodiment.
Figure 3:
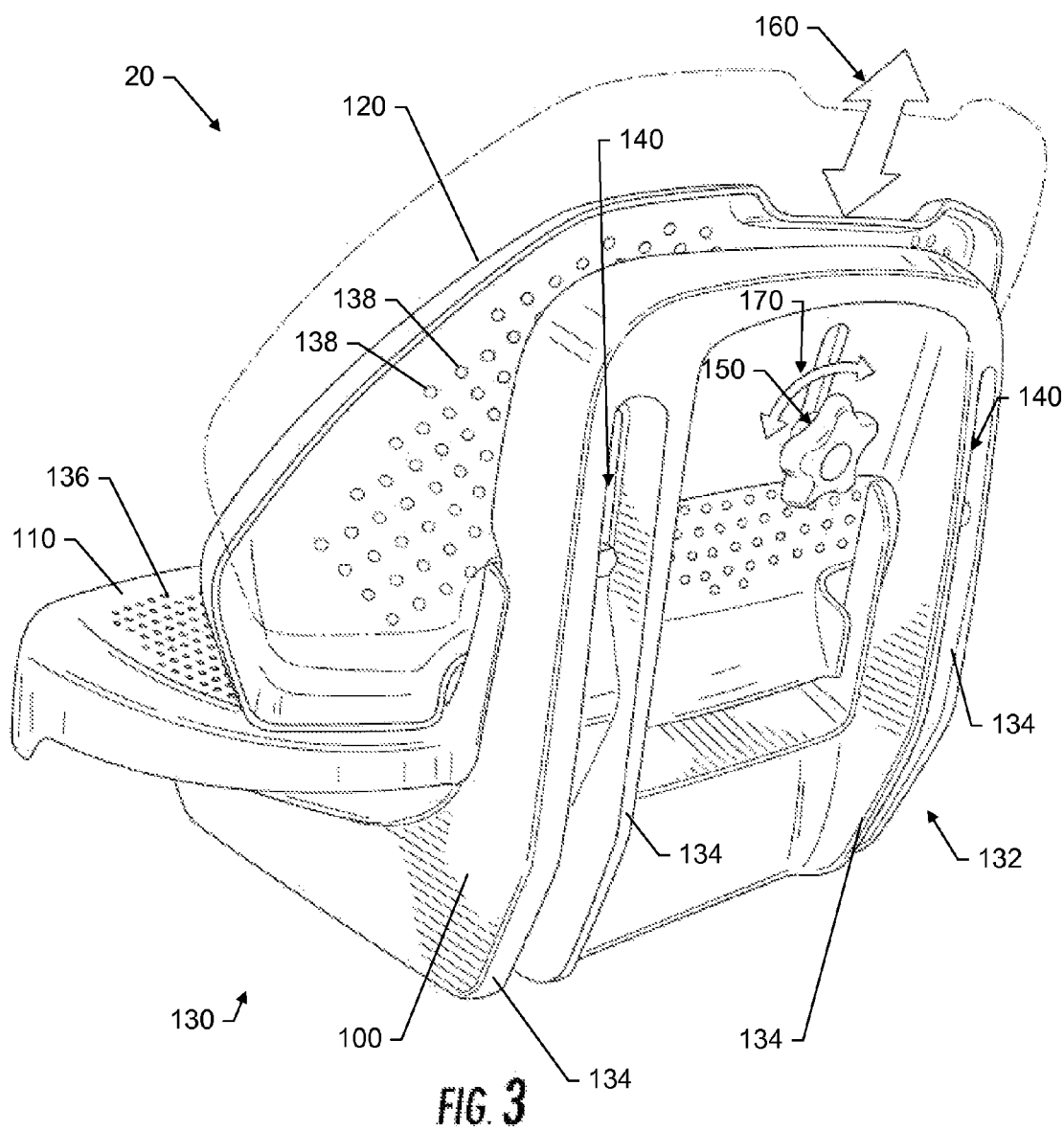
FIG. 3 illustrates a perspective view of the adjustable seat in a fully lowered or retracted position according to an example embodiment.

Some example embodiments of the adjustable seat 20 will now be described in reference to FIGS. 2-5, which illustrate various different views of an example embodiment. However, it should be appreciated that the views illustrated in FIGS. 2-5 are provided for purposes of facilitating a description of an example embodiment and are not intended to limit example embodiments. FIG. 2 illustrates a perspective view of the adjustable seat 20 in a fully raised or extended position according to an example embodiment. FIG. 3 illustrates a perspective view of the adjustable seat 20 in a fully lowered or retracted position according to an example embodiment. FIG. 3 also illustrates a mechanism for adjusting a position of the adjustable seat 20 and shows a full range of motion of the adjustable seat 20 in one example embodiment. FIG. 4, which includes FIGS. 4A and 4B, illustrates a back view of the adjustable seat 20 in a fully raised or extended position (FIG. 4A) and in a fully lowered or retracted position (FIG. 4B) according to an example embodiment. FIG. 5 illustrates an exploded perspective view of the adjustable seat 20 according to one example embodiment.

Referring now primarily to FIGS. 2-4, the adjustable seat 20 may include a seat frame 100, a seat bottom 110 and a seat back 120. The seat frame 100 may be directly or indirectly coupled to the seat base 70. In some embodiments, the seat frame 100 may be directly coupled to the seat base 70 by being integrally formed with the seat base 70. In other embodiments, the seat frame 100 is attachable to the seat base 70 via bolts, hooks, pins, and/or other attachment structures. In an example embodiment, the seat frame 100 may be made from a rigid material such as any of various forms of plastic or metal. In some cases, the seat frame 100 may be molded into a single unitary member. The seat frame 100 may be substantially L-shaped when viewed from a side view. In some embodiments, the seat frame 100 may include a seat bottom support section 130 and a seat back support section 132. As such, for example, the seat bottom support section 130 may form one portion of the L-shaped structure (e.g., the bottom portion when the adjustable seat 20 is attached to the riding lawn care vehicle 10), while the seat back support section 132 forms another portion of the L-shaped structure (e.g., the top portion when the adjustable seat 20 is attached to the riding lawn care vehicle 10). In some cases, the seat bottom support section 130 and the seat back support section 132 may be formed to create an angle that is nearly a right angle relative to one another. However, in some cases, the angle formed between the seat bottom support section 130 and the seat back support section 132 may be slightly obtuse in order to provide greater comfort to an operator sitting in the adjustable seat 20.

In an example embodiment, each of the seat bottom support section 130 and the seat back support section 132 may include shared longitudinal support structures and distinct transverse support structures. In this regard, for example, the seat frame 100 may include a plurality of spine members 134 that extend along a longitudinal length of the seat frame 100 to define the L-shape of the seat frame 100 and to provide a rigid support for the L-shape of the seat frame 100. The spine members 134 may also provide support for the transverse support structures, which in some embodiments may be sheets or plates of molded plastic that extend between and/or over the spine members 134. In one example embodiment, two spine members 134 may extend parallel to each other at each respective outside longitudinal edge of the seat frame 100 at least in the seat back support section 132. Moreover, pairs of spine members 134 on opposite sides of the seat frame 100 may be substantially mirror images of each other such that the seat frame 100 is substantially symmetric with respect to a centerline drawn through the longitudinal axis of the seat frame 100.

In some embodiments, the seat bottom support section 130 may include an underside, which may be connectable to the seat base 70, and a topside that may be connectable to the seat bottom 110. In some embodiments, the seat bottom support section 130 may be bolted to the seat base 70 and/or the seat bottom 110 via one or more attachment bolts. However, other forms of attachment may alternatively be employed such as snap fittings, rivets, screws, and/or the like.

In an example embodiment, the seat bottom 110 may be formed from a molded sheet of plastic or other material. In this regard, in some embodiments, the entire seat bottom 110 may be formed from a unitary piece of molded plastic. Thus, for example, the seat bottom 110 may be formed into a relatively thin and lightweight support structure that may be shaped to provide comfort and support to a seated operator of the riding lawn care vehicle 10. In the example embodiment shown in FIGS. 2 and 3, the seat bottom 110 includes a plurality of breathing holes 136 positioned throughout the seat bottom 110. The breathing holes 136 may prevent heat from being trapped by the seat bottom 110 and further increase operator comfort. A size and density of the breathing holes 136 may be selected such that the rigidness of the seat bottom 110 is not compromised, while still providing sufficient breathable characteristics. In some cases, one or more attachment members (e.g., bolts, rivets, snap fittings, screws and/or the like) may provide a fixed connection between the seat bottom 110 and the seat bottom support section 130 of the adjustable seat 20.

The seat back 120 may also be formed from a single unitary molded sheet of plastic or other material. As such, for example, the seat back 120, the seat bottom 110 and the seat frame 110 of one embodiment may each be separately molded from a polymeric material, such as, for example, polyethylene, polypropylene, polystyrene, PVC, rubber, synthetic rubber, and/or other natural or synthetic polymers or combinations thereof. Molding the polymeric material(s) into the seat back 120, the seat bottom 110 and the seat frame 100 described herein may be performed using injection molding, transfer molding, compression molding, thermoforming, and/or other known molding techniques. However, it should be appreciated that some alternative embodiments may alternatively employ padded seats where foam, cloth, batting or other padding materials may be used to cover at least a portion of the seat back 120 and/or the seat bottom 110. In some examples, the seat back 120 may include breathing holes 138 similar to the breathing holes 136 described above in connection with the seat bottom 110.

In an example embodiment, the seat back 120 may be configured to be adjustable relative to the seat bottom 110. In this regard, for example, the seat back 120 may be configured to be slidably connected to the seat frame 100 so that the seat back 120 may be shifted toward or away from the seat bottom 110 along seat back support section 132 of the seat frame 100. When the adjustable seat 20 is affixed to the riding lawn care vehicle 10, the movement of the seat back toward or away from the seat bottom 110 generally results in a movement in downward and upward directions, respectively.

To facilitate slidable connection between the seat back 120 and the seat frame 100, and enable the seat back 120 to be fixed at any of various different distances from the seat bottom 110, some example embodiments may include one or more alignment members 140 and an adjustment member 150. The adjustment member 150 may be selectably engaged or disengaged (e.g., tightened or loosened) in order to permit the seat back 120 to be fixed in position relative to the seat bottom 110 (e.g., when engaged) or to move relative to the seat bottom 110 (e.g., when disengaged). FIG. 3 illustrates the fully lowered position of the seat back 120 in solid lines and arrow 160 illustrates the capability for directions of movement of the seat back 120 between fully lowered and fully extended positions. FIG. 3 illustrates the fully extended position in broken lines.

The adjustment member 150 of an example embodiment may be an adjustable bolt such as a wing bolt or other easily adjustable fastening device such as a pop pin and/or the like. The adjustment member 150 of some examples may be turned or rotated to facilitate tightening (e.g., by turning in the clockwise direction) or loosening (e.g., by turning in the counter clockwise direction) to respectively engage or disengage the adjustment member 150 as shown by arrow 170. However, when pop pins or other adjustable devices are employed, the adjustment member 150 may be engaged and/or disengaged by alternately seating or pulling out the pop pin. In an example embodiment, the adjustment member 150 may be configured to fix the seat frame 100 relatively tightly to the seat back 120 when the adjustment member 150 is in the engaged position and to allow the seat back 120 to move (e.g., slide) relative to the seat frame 100 when the adjustment member is in the disengaged position.

As indicated above, the adjustment member 150 of some example embodiments may be a wing bolt or other adjustable bolt (e.g., with a substantially star shaped or other enlarged plastic handle to facilitate operator gripping) that is passed through a guide slot 180 in the seat frame 100 (or more particularly through a slot positioned in the transverse support structure in the seat back support section 132 of the seat frame 100) to be connected to a portion of the seat back 120. In an example embodiment, the adjustment member 150 may be disposed to engage the seat back 120 substantially in a center portion of the seat back 120 and the guide slot 180 may be disposed substantially in a center portion of the transverse support section of the seat back support section 132 of the seat frame 100 extending longitudinally in a vertical direction. In some cases, a diameter of the shank of the adjustment member 150 may be small enough to enable the shank to freely move up and down in the guide slot 180. Meanwhile, a head (or a washer positioned between the head and the guide slot 180) of the adjustment member 150 may be larger than a width of the guide slot 180. Thus, when the adjustment member 150 is in the engaged position (or tightened), the head may pinch against sidewalls of the guide slot 180 to fix a position of the seat back 120 relative to a position of the seat frame 100 as the adjustment member 150 is drawn further toward or into the seat back 120. In some example embodiments, the seat back 120 is fixed in position relative to the seat frame 100 and/or seat bottom 110 solely by the friction between the seat back 120, the adjustment member 150, and/or the seat frame 100 when the adjustment member is in the engaged (or tightened) position. When the adjustment member 150 is in the disengaged position (or loosened), the head may not pinch against the sidewalls of the guide slot 180 and the shank may freely move within the guide slot 180.

Although the adjustability of the height of the seat back may be provided merely by the use of the adjustment member 150, it is possible that for a wide seat back 120, it may be difficult to maintain alignment of the seat back 120 if only one point of slidable contact is maintained between the seat back 120 and the seat frame 100. Moreover, if the adjustable member 150 were accidentally or otherwise loosened to the point that the bolt disconnected from the seat back 120, it may be difficult to position and hold the seat back 120 for reattachment. Accordingly, the alignment members 140 may be employed in some embodiments in order to provide multiple points of slidable contact between the seat back 120 and the seat frame 100 and to prevent the seat back 120 from separating from the seat frame 100 during routine seat level adjustment operations.

In an example embodiment, the alignment members 140 may include alignment slots 182 and shoulder bolts 184 for riding in the alignment slots 182 to facilitate sliding of the seat back 120 relative to the seat frame 100 when the adjustment member 150 is disengaged. One example embodiment may include at least two alignment members 140. The alignment members 140 may be disposed in an upper portion of a space between the two spine members 134 positioned at each respective edge of the seat frame 100. In some embodiments, a longitudinal length of the guide slot 180 may extend substantially parallel to a longitudinal length of each of the alignment slots 182. Moreover, in some example embodiments, the longitudinal length of the guide slot 180 may be substantially the same as the length of each of the alignment slots 182 so that the range of motion that is allowable for movement of the seat back 120 relative to the seat bottom 110 is consistently maintained by each slot.

In an example embodiment, a shank of each of the shoulder bolts 184 may be passed through a corresponding one of the adjustment slots such that threads of the shoulder bolts 184 may engage the seat back 120. As such, a back side of the seat back 120 (e.g., the side that is opposite of the side that is proximate to the operator's back) may engage the threads of the shoulder bolts 184, then a shank of each of the shoulder bolts 184 may pass through the corresponding adjustment slots 182. Finally, a head of each of the shoulder bolts 184 may be positioned on an opposite side of the seat frame 100 with respect to the side of the seat frame 100 that is proximate to the seat back 120.

In an example embodiment, a diameter of the shank of the shoulder bolts 184 may be small enough to enable the shank to freely move up and down in the adjustment slots 182. Meanwhile, a head (or a washer positioned between the head and the respective adjustment slot 182) of the shoulder bolts 184 may larger than a width of the adjustment slots 182. Moreover, even when the shoulder bolts 184 are fully tightened or engaged with the seat back 120, the head of the shoulder bolts 184 may be proximate to the sidewalls of the adjustment slots 182, but may not pinch against sidewalls of the adjustment slots 182 with sufficient force to fix a position of the seat back 120 relative to a position of the seat frame 100. As such, the shoulder bolts 184 may be selected and/or formed such that, even when fully tightened, they allow the shank to freely move within the corresponding adjustment slots 182.

FIG. 5 illustrates an exploded view of the adjustable seat 20 with the seat back 120 removed to show various components more clearly. In this regard, the seat back 120 may include bolt receivers 190. In an example embodiment, one bolt receiver may be included in the back of seat back 120 (e.g., a side of the seat back 120 that is opposite of the side that is proximate to the operator's back when the operator is seated) at a position corresponding to each respective one of the guide slot 180 and the adjustment slots 182. In some embodiments, the bolt receivers 190 may each be formed from the same unitary piece of molded plastic that forms the seat back 120. However, in alternative embodiments, the bolt receivers 190 may be separately formed metal or plastic components that may be passed through and affixed to the seat back 120 at positions corresponding to positions of each respective one of the guide slot 180 and the adjustment slots 182.

As shown in FIG. 5, the adjustment member 150 may pass through the guide slot 180 and engage a center one of the bolt receivers 190. Moreover, as indicated above, the adjustment member 150 may be loosened, or even completely removed, to enable the seat back 120 to be adjusted up and down to move the seat back farther from or closer to the seat bottom 110, respectively, for operator comfort. Then, when the adjustment member 150 is tightened (e.g., by clockwise rotation thereof), the adjustment member 150 may fix a position of the seat back 120 relative to the seat bottom 110. Meanwhile, the shoulder bolts 184 may pass through corresponding ones of the adjustment slots 182 to engage outer ones of the bolt receivers 190. The shoulder bolts 184, even when fully tightened to engage the corresponding bolt receivers 190, may be permitted to freely slide in the adjustment slots 182. Accordingly, an alignment of the seat back may be maintained as the seat back 120 is passed through a full range of motion.

In some embodiments, the seat frame 110 may further include an alignment void 200 disposed between the spine members 134 and below a portion of the transverse support structure in the seat back support section 132 of the seat frame 100 that includes the guide slot 180. In such an example, the seat back 120 may further include a guide member 210 disposed at a lower middle portion of the seat back 120 to extend toward the seat frame 100 and fit within the alignment void 200. As such, for example, the guide member 210 may include flared edges that are configured to ride proximate to interior edges of the alignment void 200 to further assist with alignment of the seat back 120 relative to the seat frame 100 when the seat back 120 is adjusted relative to the seat bottom 110. In at least one example embodiment, at least a portion of the seat back 120 (e.g., the guide member 210) may touch the seat bottom 110 in a fully retracted position of the seat back 120 and no portion of the seat back 120 may touch the seat bottom 110 in all other positions of the seat back 120. However, in the example embodiment of FIGS. 2-5, at least a portion of the seat back 120 (e.g., the guide member 210) may touch the seat bottom 110 throughout the full range of motion of the seat back 120 even though the seat back 120 can be extended away from the seat bottom 110. In this regard, for example, the seat bottom 110 may include a spine receiver portion 220 that may extend from the portion of the seat bottom 110 that is proximate to the seat bottom support section 130 along portions of the spine members 134 extending away from the seat bottom support section 130. A portion of the seat back 120 (e.g., the guide member 210) may maintain contact with (or be in close proximity with) the spine receiver portion 220 of the seat bottom 110. In this regard, the spine receiver portion 220 may extend along an interior portion of the alignment void 200.

Alternative structures beyond those shown in FIGS. 2-5 are also possible as shown in FIGS. 6 and 7. For example, in some example embodiments, rather than being passed through the guide slot 180, the adjustment member 150 (or multiple adjustment members) may be passed through any one of a plurality of discrete guide holes 240 that may be positioned in or between spine members 134 as shown in FIG. 6. Each discrete guide hole 240 may correspond to a different respective height for the seat back 120. As another alternative, rather than engaging a single centrally located bolt receiver 190 through the guide slot 180, the adjustment member 150 may pass through a single guide hole 242 to engage any one of a plurality of teeth 244 that may be positioned on a back side of the seat back (e.g., the side opposite to the size proximate to the operator's back, when the operator is seated on the adjustable seat 20. The adjustment member 150 may be withdrawn to permit sliding of the seat back 120 up or down and then re-inserted into a space between two of the teeth 244 to fix a position of the seat back 120 relative to the seat bottom 110.

Accordingly, some example embodiments may enable the adjustable seat 20 to be adjusted in height such that the support provided to the back of a seated operator may be selected by the operator and relatively easily adjusted for improved operator comfort during operation of the riding lawn care vehicle 10. However, the adjustability of the adjustable seat 20 may also provide further advantages. For example, the adjustable seat 20 may be shipped in a smaller container or box 250 than a seat having a profile that is fixed at some size that is larger than the smallest profile permitted by the adjustable seat 20. Thus, while other seats may be required to be disassembled to reduce their shipping profiles, which may add a burden of assembly for the dealer or operator, example embodiments may be shipped already assembled and still maintain a relatively small profile to increase the number of units that can be shipped in a given volume of space. FIG. 8 illustrates a side view of the adjustable seat 20 boxed for shipment in the fully retracted position according to an example embodiment. In this regard, the adjustable seat 20 is shown in a box 220 and it should be appreciated that the size of the box 220 may be smaller than would otherwise be provided for a seat that is not adjustable and allows for a seat back height that is higher than the lowest seat back height setting possible on the adjustable seat 20.

It should be appreciated that some embodiments of the invention, such as those illustrated herein, are configured such that an operator may be able to adjust the seat relatively easily by hand and without the use of external tools. For example, the presence of a single adjustment member 150 with a star-shaped head (e.g., as shown in the FIG. 2) may allow the operator to easily and quickly adjust the seat back with one hand while the operator is sitting in the adjustable seat 20, perhaps without the operator even needing to look at the adjustment member 150 as the operator makes the adjustments.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
 a frame to which wheels of the riding lawn care vehicle are attachable;
 a seat base coupled to the frame; and
 an adjustable seat coupled to the seat base of the riding lawn care vehicle to enable selectable repositioning of at least a portion of the adjustable seat at variable distances from the seat base, the adjustable seat comprising:
  a seat frame comprising a seat bottom support section forming a first portion of an L-shaped structure defining the seat frame and a seat back support section forming a second portion of the L-shaped structure, the seat frame being attachable to the seat base;
  a seat bottom coupled to the seat bottom support section; and
  a seat back slidingly coupled to the seat back support section of the seat frame,
 wherein the adjustable seat further comprises an adjustable member configured to enable a position of the seat back to be adjusted relative to a position of the seat bottom in response to the adjustable member being disengaged and to enable a position of the seat back to be fixed relative to a position of the seat bottom in response to the adjustable member being engaged,
 wherein the adjustable seat further comprises at least one alignment member disposed to provide alignment of the seat back with the seat frame and to provide sliding engagement between the seat back and the seat frame, and
 wherein the at least one alignment member comprises a shoulder bolt comprising a head that is larger than a width of an alignment slot disposed in the seat back support section of the seat frame and a shank comprising a diameter that is less than the width of the alignment slot, wherein the shank passes through the alignment slot to engage the seat back, and wherein the shank slides freely in the alignment slot when the shoulder bolt is fully tightened.

2. The riding lawn care vehicle of claim 1, wherein the adjustable member comprises a tightenable bolt comprising a head that is larger than a width of a guide slot disposed in the seat back support section of the seat frame and a shank comprising a diameter that is less than the width of the guide slot, wherein the head is adjustable from a side of the seat frame that is opposite to the side of the seat frame that is proximate to the seat back, and wherein the shank passes through the guide slot to engage the seat back.

3. The riding lawn care vehicle of claim 1, wherein the seat frame comprises at least two spine members extending along a longitudinal length of the seat frame to define the substantially L shape, and wherein the alignment slot is disposed between the at least two spine members.

4. The riding lawn care vehicle of claim 1, wherein the adjustable member is slidable within a guide slot comprising a longitudinal length that defines a range of motion of the seat back relative to the seat bottom when the adjustable member is disengaged, and wherein the adjustable seat comprises two alignment members, each of which comprises an alignment slot comprising a longitudinal length that is substantially equal to the longitudinal length of the guide slot.

5. The riding lawn care vehicle of claim 1, wherein the seat bottom support section and the seat back support section are disposed to create an obtuse angle with respect to each other.

6. The riding lawn care vehicle of claim 1, wherein the seat back and the seat bottom each comprise a plurality of breathing holes disposed therein.

7. The riding lawn care vehicle of claim 1, wherein the seat back support section of the seat frame comprises an alignment void and wherein the seat back comprises a guide member that protrudes into the alignment void to facilitate alignment of the seat back to the seat frame during movement of the seat back relative to the seat bottom.

8. The riding lawn care vehicle of claim 1, wherein at least a portion of the seat back touches the seat bottom throughout a full range of motion of the seat back.

9. The riding lawn care vehicle of claim 1, wherein the seat frame comprises a first unitary piece of molded material, the seat bottom comprises a second unitary piece of molded material, and the seat back comprises a third unitary piece of molded material.

10. The riding lawn care vehicle of claim 1, wherein the adjustable seat is configured to enable an operator to selectably reposition, by hand and without use of external tools, at least a portion of the adjustable seat at variable distances from the seat bottom.

11. The riding lawn care vehicle of claim 1, wherein the adjustable member is configured to:
enable a position of the seat back to be adjusted relative to a position of the seat bottom when disengaged, and
fix the position of the seat back relative to the position of the seat bottom using friction when engaged.

12. The riding lawn care vehicle of claim 1,
wherein at least a portion of the seat back touches the seat bottom throughout a full range of motion of the seat back while the seat back slides away from the seat bottom.

13. The riding lawn care vehicle of claim 12, wherein the seat back is slidingly coupled to the seat back support section, and wherein the adjustable seat is adjustable to a first position where at least a portion of the seat back is positionable above the height of the steering apparatus and a second position where the entirety of the seat back is below the highest point of the steering apparatus.

14. The riding lawn care vehicle of claim 12, wherein the adjustable seat is adjustable to a position where a top portion of the seat back is positionable substantially even with a height of the steering apparatus.

15. The riding lawn care vehicle of claim 12, wherein an entirety of the seat back is positionable below a highest point of the steering apparatus.

16. The riding lawn care vehicle of claim 1, further comprising a cutting deck having at least one cutting blade mounted therein.

17. The riding lawn care vehicle of claim 1, wherein the riding lawn care vehicle is a riding lawn mower.

18. The riding lawn care vehicle of claim 1, wherein the riding lawn care vehicle is a lawn tractor.

19. An adjustable seat for a riding lawn care vehicle, the adjustable seat being coupled to a seat base of the riding lawn care vehicle to enable selectable repositioning of at least a portion of the adjustable seat at variable distances from the seat base, the adjustable seat comprising:
a seat frame comprising a seat bottom support section forming a first portion of an L-shaped structure defining the seat frame and a seat back support section forming a second portion of the L-shaped structure, the seat frame being attachable to the seat base;
a seat bottom coupled to the seat bottom support section; and
a seat back slidingly coupled to the seat back support section of the seat frame,
wherein the adjustable seat further comprises an adjustable member configured to enable a position of the seat back to be adjusted relative to a position of the seat bottom in response to the adjustable member being disengaged and to enable a position of the seat back to be fixed relative to a position of the seat bottom in response to the adjustable member being engaged,
wherein the adjustable seat further comprises at least one alignment member disposed to provide alignment of the seat back with the seat frame and to provide sliding engagement between the seat back and the seat frame, and
wherein the at least one alignment member comprises a shoulder bolt comprising a head that is larger than a width of an alignment slot disposed in the seat back support section of the seat frame and a shank comprising a diameter that is less than the width of the alignment slot, wherein the shank passes through the alignment slot to engage the seat back, and wherein the shank slides freely in the alignment slot when the shoulder bolt is fully tightened.

20. The adjustable seat of claim 19, wherein the adjustable member comprises a tightenable bolt comprising a head that is larger than a width of a guide slot disposed in the seat back support section of the seat frame and a shank comprising a diameter that is less than the width of the guide slot, wherein the head is adjustable from a side of the seat frame that is opposite to the side of the seat frame that is proximate to the seat back, and wherein the shank passes through the guide slot to engage the seat back.

* * * * *